(12) United States Patent
Lenrow et al.

(10) Patent No.: US 11,825,309 B2
(45) Date of Patent: Nov. 21, 2023

(54) PROVIDER PROXY FOR CONTROLLING NETWORK SLICE ACCESS BY USER EQUIPMENT

(71) Applicant: Verizon Patent and Licensing Inc., Basking Ridge, NJ (US)

(72) Inventors: David Robert Lenrow, Lexington, MA (US); Kalyani Bogineni, Irving, TX (US); Vinod Kumar Choyi, Conshohocken, PA (US); Jeffrey Melrose, Westlake, TX (US); Yousif Targali, Sammamish, WA (US); Deepa Jagannatha, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 223 days.

(21) Appl. No.: 17/511,938

(22) Filed: Oct. 27, 2021

(65) Prior Publication Data

US 2023/0128578 A1     Apr. 27, 2023

(51) Int. Cl.
| | |
|---|---|
| *H04W 12/088* | (2021.01) |
| *H04L 12/801* | (2013.01) |
| *H04W 12/06* | (2021.01) |
| *H04W 12/37* | (2021.01) |
| *H04L 47/12* | (2022.01) |
| *H04W 8/04* | (2009.01) |

(52) U.S. Cl.
CPC .......... *H04W 12/088* (2021.01); *H04L 47/12* (2013.01); *H04W 8/04* (2013.01); *H04W 12/06* (2013.01); *H04W 12/37* (2021.01)

(58) Field of Classification Search
CPC ...... H04L 47/12; H04W 12/06; H04W 12/08; H04W 12/086; H04W 12/088; H04W 12/35; H04W 12/37; H04W 48/02; H04W 48/08; H04W 48/18; H04W 8/04; H04W 8/205
See application file for complete search history.

(56) References Cited

U.S. PATENT DOCUMENTS

| | | | | |
|---|---|---|---|---|
| 11,690,005 | B2 * | 6/2023 | Qiao | H04W 28/24 370/329 |
| 2018/0302877 | A1 * | 10/2018 | Bosch | H04W 84/00 |
| 2019/0053104 | A1 * | 2/2019 | Qiao | H04M 15/66 |
| 2021/0212134 | A1 * | 7/2021 | Sternberg | H04W 72/51 |
| 2022/0086864 | A1 * | 3/2022 | Sabella | H04L 41/0853 |
| 2022/0408262 | A1 * | 12/2022 | Saroiu | H04W 12/03 |

* cited by examiner

*Primary Examiner* — Liton Miah

(57) ABSTRACT

Systems and methods described herein enforce access controls for network slices via proxy in a secure enclave of a user equipment (UE) device. A UE device executes, in a rich execution environment (REE), a function or application designated for using one or more secure network slices of a telecommunications network. The UE device executes, in a trusted execution environment (TEE), a slice admission control proxy (SACP) to perform admission control for the one or more secure network slices, and forces network traffic for the function or application through the SACP.

20 Claims, 7 Drawing Sheets

PROVIDER PROXY FOR CONTROLLING NETWORK SLICE ACCESS BY USER EQUIPMENT

BACKGROUND

Advanced mobile networks (i.e., Fifth Generation (5G) and Sixth Generation (6G) networks) are being implemented as the next stage networks in the evolution of mobile wireless networks. These networks incorporate many new advances in technology. For example, these networks will have the capability to perform network slicing to increase network efficiency and performance. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources and may be configured to implement a different set of requirements. Providers of networks may implement network slices with value added network features including differentiated routing of traffic onto one of many slices from user equipment to user equipment.

DETAILED DESCRIPTION OF EXAMPLE EMBODIMENTS

The following detailed description refers to the accompanying drawings. The same reference numbers in different drawings may identify the same or similar elements.

Due to network slicing technology and increasing bandwidth capability of advanced mobile networks, mobile network operators may soon be managing hundreds or thousands of network slices. Each network slice can have its own architecture, management, and security requirements to support a specific use case. Therefore, controlled access for at least some of these network slices will become a critical aspect. Furthermore, future networks may seek capabilities of a zero-trust slice, implying strong send-side policy enforcement to keep unauthorized traffic off the zero-trust slice. As used herein, a network slice that requires controlled access may be referred to as a "secure network slice."

Systems and methods described herein may apply slice access controls via a programmable software agent that is deployed on user equipment (UE) devices within a mobile network operator's (MNO's) telecommunications network to manage end-to-end services. The programmable software agent may effectively move the subscriber/provider demarcation from a provider's network edge (e.g., a Radio Access Network (RAN) edge) to the subscriber-provided UE device. According to implementations described herein, software defined packet processing features for a MNO may be extended to execute on a UE device owned and operated by a mobile network subscriber.

Figure 1:
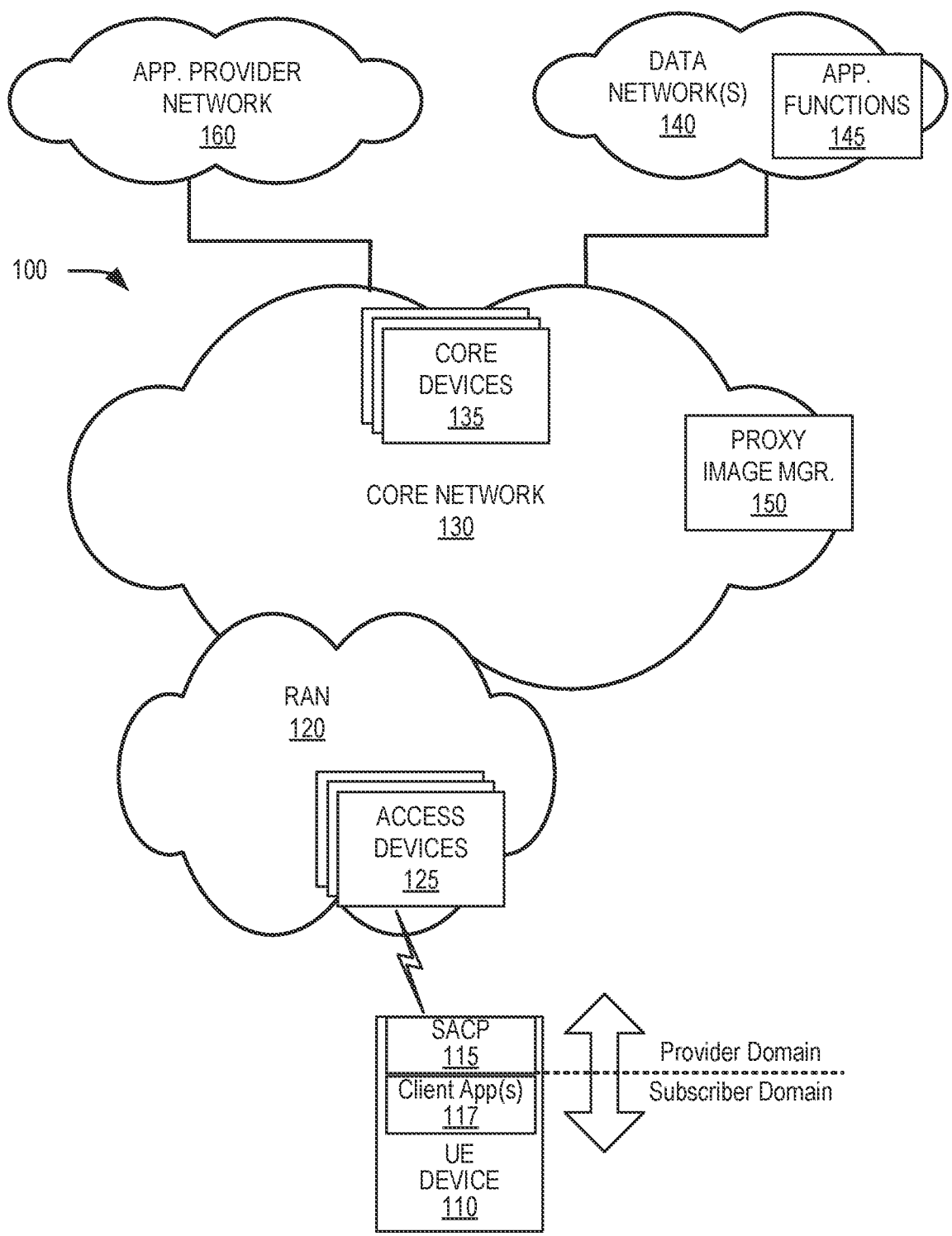
FIG. 1 is a diagram illustrating an example network environment in which systems and methods described herein may be implemented.

FIG. 1 is a diagram of an example environment 100 in which the systems and/or methods described herein may be implemented. As shown in FIG. 1, environment 100 may include a UE device 110, a RAN 120 including access devices 125, a core network 130 with core devices 135, a data network 140 with application functions 145, a proxy image manager 150, and an application provider network 160. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

UE device 110 may include a device with long-range (e.g., cellular or mobile wireless network) wireless communication functionality. UE device 110 may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or another device that includes cellular communication capabilities. In other implementations, UE device 110 may be implemented as a machine-type communications (MTC) device, an Internet of Things (IoT) device, a machine-to-machine (M2M) device, etc. According to implementations described herein, UE device 110 may be provisioned (e.g., via a subscriber identity module (SIM) card or another secure enclave) to recognize particular network identifiers (e.g., associated with RAN 120) and to support particular RF spectrum ranges.

UE device 110 may include one or more applications (e.g., client applications 117) or functions that are associated with Subscribed-Network Slice Selection Assistance Information (S-NSSAI). The S-NSSAI may indicate, for example, a particular network slice that is optimally configured for a type of traffic required by an application/function executed on UE device 110 (e.g., traffic such as massive IoT data, video streaming, designated emergency data, etc.). When a UE device attaches to RAN 120 to receive the service on the network slice, the UE device 110 typically provides the S-NSSAI to the access device 125.

According to implementations described herein, UE device 110 may be configured with a Slice Admission Control Proxy (SACP) 115 to perform admission control for secure network slices based on policies applied to strongly authenticated traffic flows. In one aspect, SACP 115 may be implemented via a sidecar injected into a confidential computing enclave of UE device 110. As used herein, the term "sidecar" may refer to a utility container or code in a device that adds functionality to support the device. For example, a sidecar may be a software module that provides UE device 110 with a specific functionality for policy-based slice admission control. As described further herein, SACP 115 may be positioned as a "bump-in-the-wire" (e.g., requiring no additional network addressing or routing configuring) in network environment 100, located between applications executed on UE device 110 (e.g., client application 117) and RAN 120.

In an exemplary implementation, as shown in FIG. 1, SACP 115 may demarcate the boundary between the service provider's administrative domain or network and the subscriber or customer. In such an implementation, SACP 115 may mark the handoff point from the service provider to the customer and vice versa. SACP 115 may be provided for each subscriber UE device 110 in a MNO's network to provide a distributed service platform that allows for diverse quality-of-service (QoS), security, routing, and additional features. SACP 115 thus may allow policy enforcement at the device level to enable providers to provide end-to-end security (including isolation, segmentation) for traffic entering and exiting a modem of UE device 110.

RAN 120 may include one or multiple networks of one or multiple types and technologies that support network slicing. For example, RAN 120 may be implemented to include a 5G New Radio (NR) RAN or a future generation RAN (e.g., a 6G-RAN or subsequent generation RAN). RAN 120 may also include a legacy RAN (e.g., a Third Generation (3G) RAN, a 4G or 4.5 RAN, etc.). RAN 120 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an open RAN (O-RAN) network, a virtualized RAN (vRAN), a self-organizing network (SON), a wired network (e.g., optical, cable, etc.), an optical network, or another type of network that provides access to or can be used as an on-ramp to RAN 120, core network 130, and/or data network 140.

Depending on the implementation, RAN 120 may include one or multiple types of network devices, such as access devices 125. For example, an access device 125 may include a next generation Node B (gNB), an evolved Long Term Evolution (eLTE) eNB, an eNB, a radio network controller (RNC), a remote radio head (RRH), a baseband unit (BBU), a radio unit (RU), a centralized unit (CU), a CU control plane (CU CP), a CU user plane (CU UP), a Distributed Unit (DU), a small cell node (e.g., a picocell device, a femtocell device, a microcell device, a home eNB, etc.), 5G ultra-wide band (UWB) nodes, a future generation wireless access device (e.g., a 6G wireless station, etc.), another type of wireless node (e.g., a WiFi device, a WiMax device, a hotspot device, etc.) that provides a wireless access service, or another type of network device that provides a transport service (e.g., routing and forwarding). Additionally, or alternatively, access device 125 may include a wired and/or optical device (e.g., modem, wired access point, optical access point, Ethernet device, etc.) that provides network access. According to some implementations, access device 125 may include a combined functionality of multiple RATs (e.g., 4G and 5G functionality, 5G and 5.5G functionality, etc.) based on demands and needs.

Core network 130 may include one or multiple networks of one or multiple types. For example, core network 130 may be implemented to include a terrestrial network and/or a satellite network. According to an exemplary implementation, core network 130 includes a network that may interact with multiple types of RANs 120. For example, core network 130 may include the core part of a 5G network, a 6G network, an LTE network, an LTE-A network, a legacy network, and so forth.

Depending on the implementation, core network 130 may include various network elements that may be implemented in core devices 135. Core devices 135 may include physical function nodes, virtual network functions (VNFs), or containerized network functions (CNF). Thus, the components of core network 130 may be implemented as dedicated hardware components and/or as virtual functions implemented on top of a commonly shared physical infrastructure using, for example, Software Defined Networking (SDN). Such network elements may include a user plane function (UPF), a session management function (SMF), a core access and mobility management function (AMF), a unified data management (UDM), a packet data network gateway (PGW), a serving gateway (SGW), a policy control function (PCF), an authentication server function (AUSF), a home subscriber server (HSS), as well other network elements pertaining to various network-related functions, such as billing, security, authentication and authorization, network polices, subscriber profiles, network slicing, and/or other network elements that facilitate the operation of core network 130. In some implementations, one or more core devices 135 may provide information to access devices 125 to facilitate network slicing.

Data network 140 may include one or multiple networks. For example, data network 140 may be implemented to provide a service or include an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 140 may include various network devices that provide various applications, services, or other type of UE device assets (e.g., servers (e.g., web, application, cloud, etc.), mass storage devices, data center devices), and/or other types of network services pertaining to various network-related functions. According to an implementation described herein, data network 140 may include one or more application functions 145 that provide application services to UE devices 110. Core network 130 may associate an application function 145 with a network slice, such as a secure network slice, to service a corresponding application (e.g., client application 117) on UE devices 110.

Proxy image manager 150 may include a network device to perform life cycle management for SACP 115 in UE devices 110. Proxy image manager 150 may ensure that an executable trusted proxy is maintained in UE device 110. For example, proxy image manager 150 may remotely download a trusted proxy image (e.g., for SACP 115) during every boot operation for UE device 110. In one implementation, as shown in FIG. 1, proxy image manager 150 may be included within core network 140. In other implementations, proxy image manager 150 may be included within another area of a MNO's network.

Application provider network 160 may include a server that acts as a repository for applications, such as client applications 117, that may be downloaded and executed by UE device 110. Although shown separately in FIG. 1, application provider network 160 may be one of data networks 140. While only one application provider network 160 is shown in FIG. 1, in various embodiments, multiple application provider networks 160 may be associated with different entities and used within environment 100.

Although FIG. 1 shows example components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
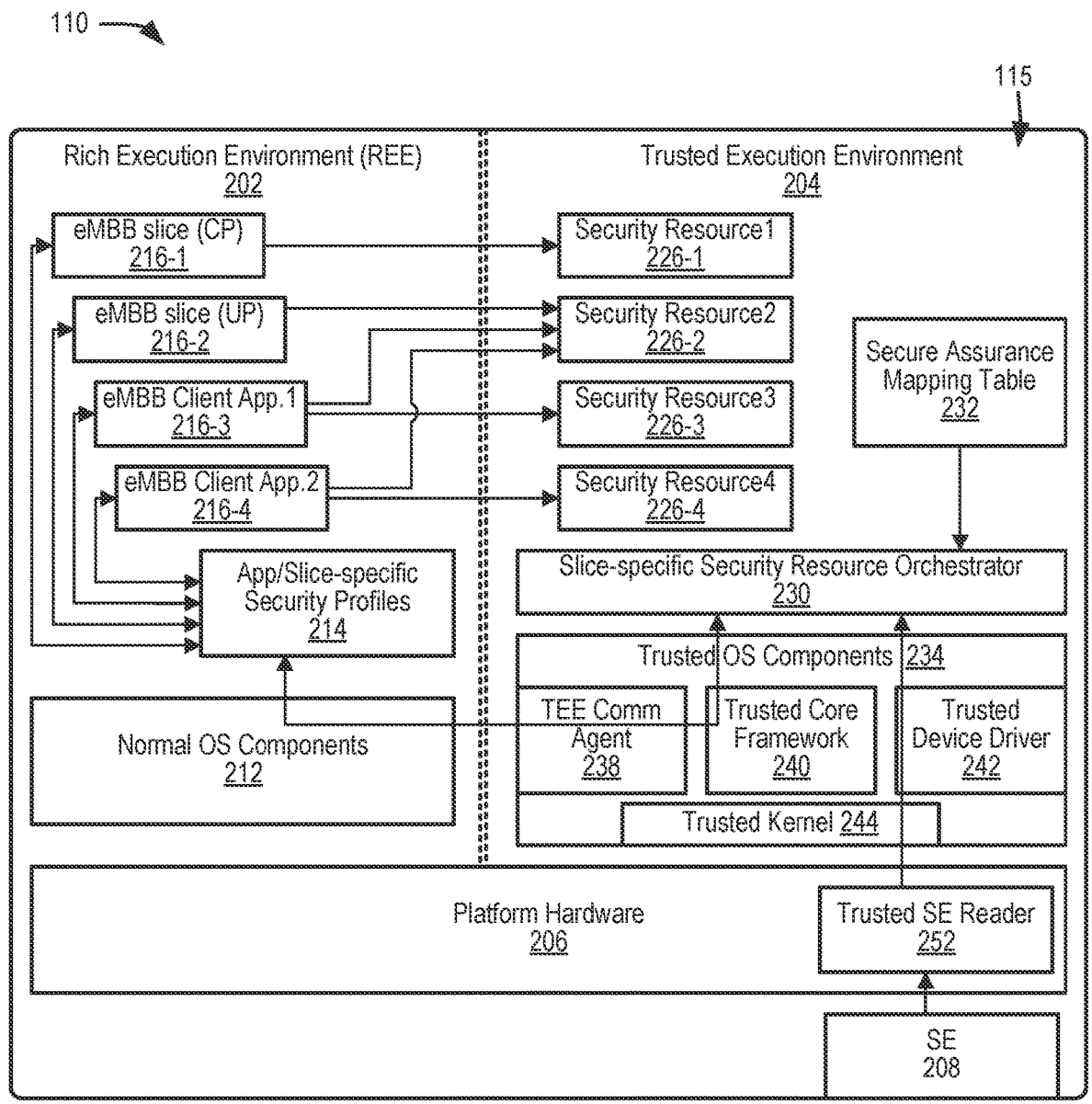
FIG. 2 is a diagram illustrating a configuration of a user equipment (UE) device according to implementations described herein.

FIG. 2 is a block diagram of a UE device 110 configured for slice-specific security resource orchestration, according to an implementation described herein. As shown in FIG. 2, UE device 110 may include components for SACP 115 to provide slice-specific access controls divided between a rich execution environment 202 and a trusted execution environment (TEE) 204 operating on platform hardware 206.

Rich execution environment (REE) 202 may be a "normal" or less secure environment for UE device 110. REE 202 may include normal operating system (OS) components 212, slice-specific security profiles 214, and a variety of functions/applications 216-1 through 216-4 that are configured to operate on secure network slices that require confidentiality. REE 202 may also include open applications or services (not shown) that do not use restricted slices and, thus, do not require any interface with TEE 204. These open applications may be accessed using normal OS components 212, which similarly do not require any interface with TEE 204.

Slice-specific security profiles 214 may include network slice requirements for applications stored in UE device 110. Slice-specific security profiles 214 may define security parameters, such as encryption requirements, isolation requirements, and other protocols that a network slice must have to support a particular application or function. According to an implementation, slice-specific security profiles 214 may be defined for each OEM application/function and subsequently added client applications for UE device 110. In one aspect, security requirements for applications in slice-specific security profiles 214 may be defined in generic terms, such as "low," "medium," and "high," without reciting specific protocols or security functions.

Functions/applications 216 may include functions and/or applications with designated secure network slice requirements. In some instances, functions/applications 216 may correspond to subscribed services for UE device 110, such as enhanced Mobile Broadband (eMBB) or IoT services. In other implementations, functions/applications 216 may correspond to client applications 117. For example, function 216-1 may identify a default slice designated for eMBB control plane (CP) communications, and function 216-2 may identify a default slice designated for an eMBB user plane (UP) communications. Application 216-3 may be, for example, a client application requiring eMBB services using Transport Layer Security (TLS). Application 216-4 may be, for example, another client application requiring eMBB services using Datagram TLS (DTLS). In other implementations, function/applications 216 may be designated for different service levels and/or protocols. The particular designated network slice requirements for each of functions/applications 216 may be provided, for example, by a service provider, an application vendor, an app store, a network operator, etc. The slice security requirements may be stored in SE 208 (e.g., for subscribed/default functions) and/or slice-specific security profiles 214 (e.g., for client applications 117).

TEE 204 may provide a secure environment within, for example, a segmented portion of UE device 100 to implement SACP 115. TEE 204 may run isolated from the main system (e.g., REE 204) using a parallel operating system and specific drivers. TEE 204 may include a variety of security resources 226-1 through 226-4, a Slice-specific Security Resource Orchestrator 230, a Secure Assurance Mapping Table 232, and trusted OS components 234.

Each of security resources 226 may include software code to implement a particular security level or microservice that may be applied to a function/application 216. For example, security resource 226-1 and security resource 226-2 may be a package to implement certain confidentiality and integrity algorithms (e.g., NR Encryption Algorithm 128-NEA and NR Integrity Algorithm 128-NIA), which typically terminate at RAN 120. Security resource 226-3 and security resource 226-4 may include application layer security protocols for end-to-end slice security. For example, security resource 226-3 may include a package to implement a Transport Layer Security (TLS) algorithm. Security resource 226-4 may include a package to implement a Datagram TLS (DTLS). In other implementations, security resources 226 may include different or additional protocols, such as IP Security (IPSec), Secure Socket Layer (SSL), etc. As described further herein, depending on the security requirements of a network slice, a security resource 226 may be instantiated for a single slice or shared among multiple slices based on the security profile associated with the slice(s). Once linked to one or more security resources 226, traffic between function/application 216 and RAN 120 is routed through the linked security resources 226.

Security resource orchestrator 230 may manage the life cycles of security resources 226 in TEE 204. According to an embodiment, orchestrator 230 may determine whether a security resource is instantiated, terminated, or is in another state based on usage data of functions/applications 216. According to one implementation, orchestrator 230 may obtain from SE 208 (via reader 252) slice identifiers for default/subscribed slices during a UE device start-up (e.g., upon a system re-boot, etc.), determine the corresponding security profile associated with each of the slice identifiers and corresponding security resource requirements (e.g., from secure assurance mapping table 232), and instantiate and/or pair a default function 216 with appropriate security resources 226. According to another implementation, when one of functions/applications 216 is initiated after UE device start-up (e.g., upon a user launch, etc.), orchestrator 230 may obtain the slice profile from slice-specific security profiles 214 and instantiate and/or pair the function/application 216 with appropriate security resources 226. Orchestrator 230 may also perform other types of operations, such as management of memory and processors to support security resources 226 and/or other management functions pertaining to UE device 100.

Secure assurance mapping table 232 may include a data structure to map security requirements from secure enclave (SE) 208 and slice-specific security profiles 214 to particular security resources needed to implement one of functions/applications 216. For example, secure assurance mapping table 232 may include specific security protocols, isolation requirements, and other security features that map to particular requirements for an application (e.g., as obtained from slice-specific security profiles 214).

Trusted OS components 234 may provide an isolated operating system to run TEE 204. Trusted OS components 234 may include a TEE communication agent 238, a trusted core framework 240, trusted device drivers 242, and a trusted kernel 244. TEE communication agent 238 may provide a communication interface between REE 202 and TEE 204. For example, when an application 216 is launched and or installed in REE 202, TEE communication agent 238 may receive from the corresponding application/slice-specific security profiles from slice-specific security profiles store 214. Trusted core framework 240 may, for example, be partitioned to execute multiple virtual entities that can be assigned different normal worlds (e.g., REE 202) and secure worlds (e.g., TEE 204). Trusted device drivers 242 may include software to access resources in TEE 204 via confidential application programming interfaces (APIs) and/or cryptographic libraries. Similarly, trusted kernel 244 may include a segmented kernel that is accessible from trusted OS components 234 and not accessible from normal OS components 212.

Platform hardware 206 may include physical memory and processing components of UE device 110 that can be configured to spin-up or tear-down secure resources (e.g., for TEE 204). According to implementations described herein, platform hardware 206 may include a trusted SE reader 252. Trusted SE reader 252 may be configured to read/extract from SE 208 information related to a slice admission control proxy (e.g., user subscription information, a trusted proxy image, etc.).

SE 208 may be configured to include, among other features, logic for managing SACP 115. SE 208 may include a Subscriber Identification Module (SIM) card, an embedded SIM (eSIM), a Universal SIM (USIM), a 5G USIM (or other generation SIM), a Universal Integrated Circuit Card (UICC), an embedded UICC (eUICC), or a similar type of component. In some embodiments, SE 208 may include its own secure processor, I/O circuits, and secure storage (e.g., non-volatile, solid state memory such as RAM and/or ROM, volatile RAM, electrically erasable programmable ROM (EEPROM), etc.) to hold a trusted proxy image for SACP 115. SE 208 may be provisioned with a trusted proxy image (e.g., from proxy image manager 150) for SACP 115 to manage access controls for the listed network slices. SE 208 may also include a listing of network slices a UE device 110 is permitted to access (e.g., special access slices, such as eMBB slices, IoT slices, ultra-reliable low latency communication (URLLC) slices, vehicle to everything (V2X) slices, high-performance machine-type communications (HMTC), etc.), which may correspond to one or more of functions/applications 216.

Functions/applications 216 may have a security profile for which security resources 226 are used to implement required security levels. Security resources 226 for slices that support subscribed (or default) services (e.g., as indicated in SE 208) may be instantiated in TEE 204 during boot operations for UE device 110. For example, as part of a boot/re-boot process, orchestrator 230 may identify, from SE 208, subscription requirements for eMBB function (CP) 216-1 and eMBB function (UP) 216-2. Orchestrator 230 may obtain slice security requirements from mapping table 232 and may instantiate security resource 226-1 and security resources 226-2 to provide the required security for eMBB function (CP) 216-1 and eMBB function (UP) 216-2. The security profile may indicate the level of security needed, which may be qualitative (e.g., low, medium or high) or may be quantitative (e.g., scale of 1 to 10; with 1 being low and 10 being high). A mapping of the security profile to the security features and corresponding granular security properties (e.g., security configuration, data-at-rest protection, data-in-transit protection, algorithms—AES/SHA-256, RSA, ECC, protocols—TLS/IPSec, key lengths—256 bits, key rotation etc.) is performed by the orchestrator 230 using the information available from the secure assurance mapping table 232. In some cases, the security profile associated with an application (e.g., one of function/applications 216) may explicitly indicate the security properties and thereby a mapping may be avoided. Security resources 226 that are orchestrated by the orchestrator 230 may include unique instances of mutual TLS function, random number generator function, AES encryption function that may correspond to each slice or client applications (e.g., function/applications 216-1, 216-2, 216-3, 216-4, etc.) or shared by the slice or client applications based on the security profile associated with the slice or client applications.

Still referring to FIG. 2, applications 216 (e.g., application 216-3 and 216-4) are given a security profile (e.g., provided by a third party application provider, etc.) which is stored in security profiles 214. When a user opens applications 216-3 or 216-4, for example, a network slice is assigned to support the application. Based on the security profile for the application slice, orchestrator 230 may create dedicated resources (e.g., security resources 226-3 and 226-4) in TEE 204 to support applications 216-3 and 216-4. In some cases, security resources 226 (e.g., security resources 226-2) may be shared among different applications 216, depending on the requirements of the security profiles 214 (e.g., as interpreted by mapping table 232). For example, as illustrated in FIG. 2, eMBB client application 216-3 and eMBB client application 216-4 may be linked to use a shared security resource 226-2 for user plane security. A dedicated security resource 226-3 for TLS may be orchestrated to be used only for eMBB application 216-3, and a separate dedicated security resource 226-4 may be orchestrated to be used only for eMBB application 216-4. Thus, applications 216 and security resources 226 may not have one-to-one mapping.

In the example of FIG. 2, the eMBB slice control plane 216-1 and an associated security resource 226-1 is orchestrated by orchestrator 230, that is used for securing the 3GPP control plane (e.g. RRC, NAS signaling) using, for example, NIA and/or NEA algorithms. The security resources 226-1 may be a common security resource for securing all eMBB slice control plane communications, including for eMBB client applications 216-3 and 216-4. Based on a risk profile, separate eMBB control plane security resources may be orchestrated for each slice application. According to an implementation, each slice type (e.g., eMBB, MIoT, URLLC, V2X, HMTC, etc.) for which UE device 110 is subscribed may have a dedicated security resource 226 for securing the control plane (e.g., secure communications for data-in-transit security). Applications of the same slice type (e.g., eMBB) may share a common control plane security resource (e.g., security resource 226-1), as depicted in FIG. 2.

The number and arrangement of components illustrated in FIG. 2 is provided for explanatory purposes. In practice, additional components, fewer components, different components, or differently-arranged components than those illustrated in FIG. 2 may be used. For example, while an orchestrator 230 is shown within TEE 204, in another implementation, another orchestrator may be included in REE 202 to instantiate resources for normal (e.g., less secure) network slices. Also, in some implementations, one or more of the illustrated components may perform one or more functions described as being performed by another one or more of the other components.

Figure 3:
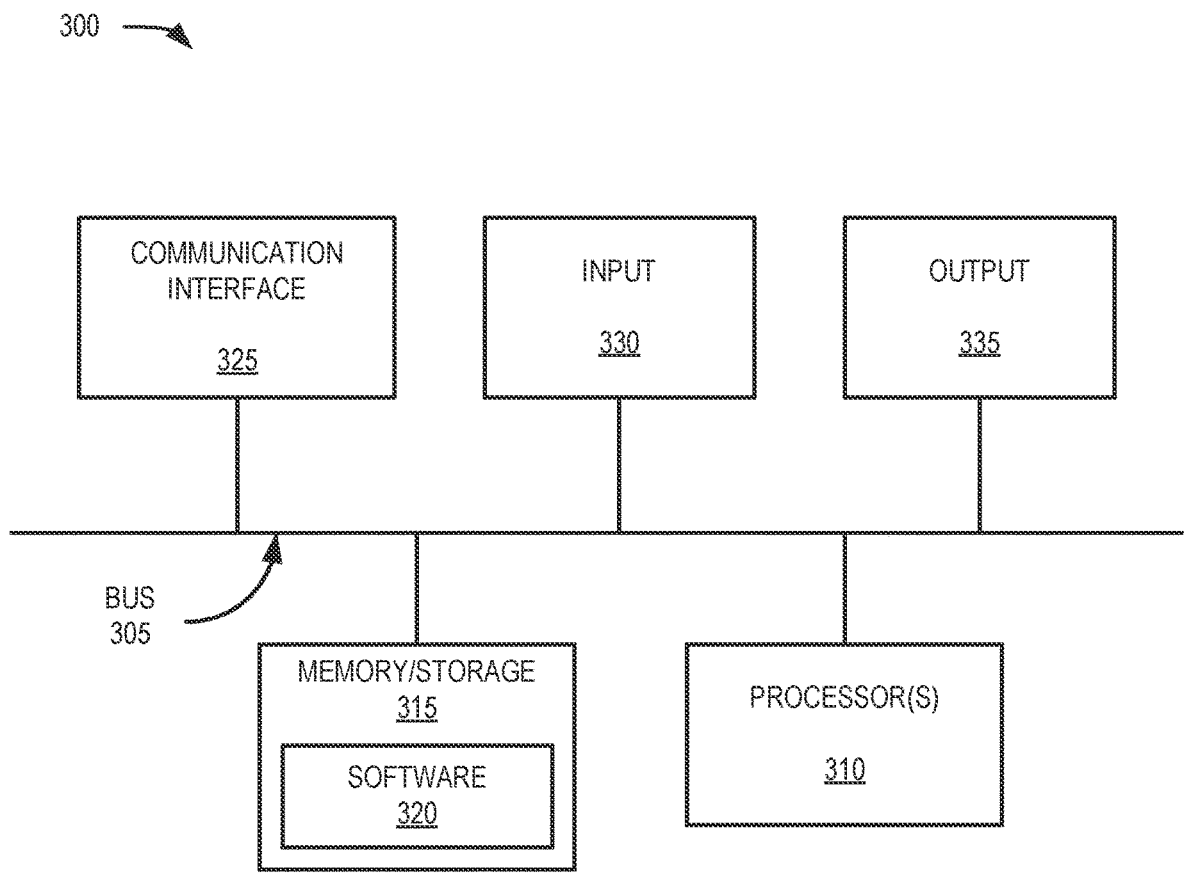
FIG. 3 is a diagram illustrating example components of a device that may correspond to one or more of the devices described herein.

FIG. 3 is a diagram illustrating example components of a device 300 according to an implementation described herein. UE device 110, access device 125, core devices 135, application functions 145, proxy manager 150, and/or other components of network environment 100 may each include one or more devices 300. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, software 320 may include an application that, when executed by processor 310, provides a function and/or a process to provide updated proxy images for the Slice Admission Control Proxy of UE device 110, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, application programming interface (API), etc.). Communication interface 325 may be implemented as a point-to-point interface, a service-based interface, or a reference interface, for example.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 300 may be implemented in an appropriate manner to support the architectures. For example, software components may be instantiated, created, deleted on device 300, or be placed in some operational state during its life-cycle (e.g., refreshed, paused, suspended, rebooting, or another type of state or status), using well-known virtualization technologies (e.g., hypervisor, container engine, virtual container, virtual machine, etc.) in an application service layer of a network (e.g., access network 130) and/or another type of network (e.g., core network 130, data network 140, etc.). Thus, network devices described herein may be implemented as device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 may cause processor 310 to perform a function or a process described herein. Alternatively, for example, according to other implementations, device 300 performs a function or a process described herein based on the execution of hardware (processor 310, etc.).

Figure 4:
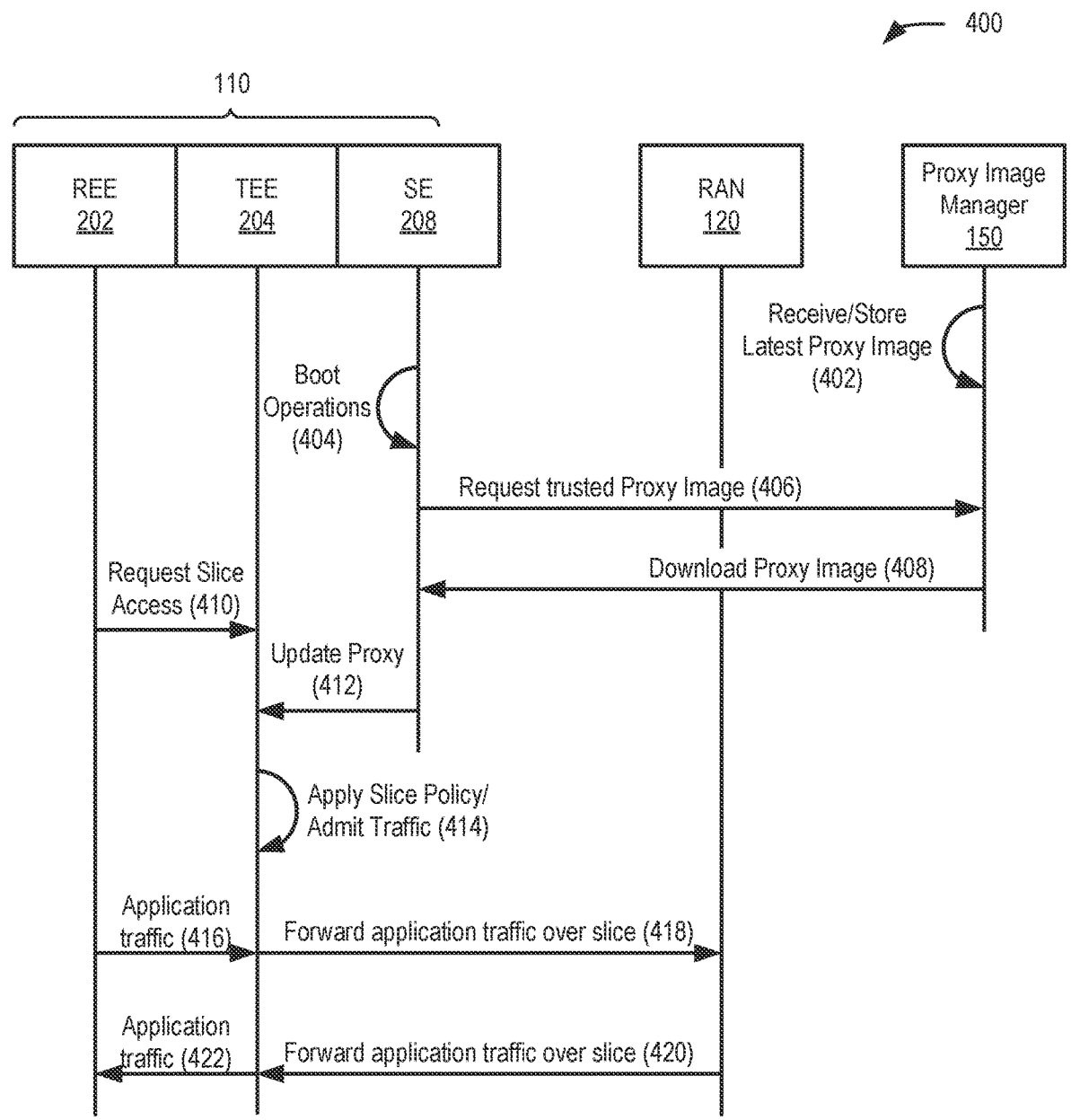
FIG. 4 is a diagram illustrating communications for enforcing access control for network slices via proxy in a secure enclave of a UE device.

FIG. 4 is a diagram illustrating communications for enforcing access control for network slices via proxy in a secure enclave of a UE device. More particularly, communications is FIG. 4 illustrate an embodiment of how SACP 115 can be provided and consistently updated by a trusted source to implement policy based slice admission controls at UE device 110. Network portion 400 may include UE device 110 with REE 202 and TEE 204, proxy manager 150, and RAN 120. FIG. 4 provides simplified illustrations of communications in network portion 400 and is not intended to reflect every signal or communication exchanged between devices/functions.

As shown at reference 402, proxy image manager 150 may receive and store a latest proxy image for SACP 115. According to an implementation, updates to SACP 115 may be provided to proxy image manager 150 on a continuous basis. For example, proxy manager 150 may receive updates from a network administrator or a network function in core network 130 to reflect new application requirements, services, slice parameters, network changes, etc.

UE device 110 may perform boot operations 404, and in response SE 208 may reach out to proxy manager 150, via request 406, to remotely download a trusted proxy image for SACP 115. The current proxy image stored by proxy image manager 150 may be considered the "golden" image that is most recent and most correct. In response to request 406, proxy image manager 150 may download 408 the latest software image for SACP 115 to SE 208.

As part of the UE device boot process, or in response to a user input, a function/application 216 in REE 202 may submit a request 410 to access a secure network slice (e.g., a network slice with restricted access). Request 410 may occur before or after TEE 204 is updated with the latest version of SACP 115, and request 410 may not be granted, for example, until after the latest version of SACP 115 is confirmed and running in TEE 204.

Upon receiving download 408, SE 208 may conduct an image update 412 over any previous pre-loaded instance of SACP 115 in TEE 204. For example, SE 208 may update SACP 115 components (e.g., orchestrator 230, mapping table 232, TEE communications agents 238, etc.) in TEE 204.

After update 412 is complete, and in response to request 410, TEE 204 may apply slice admission policies and begin to admit traffic from the particular function/application 216 in REE 202 on a restricted network slice. Application traffic 416 from REE 202 may be forwarded 418 to RAN 120 using security protocols for a designated network slice. For example, application traffic (e.g., TCP/IP packets) from a function/application 216 may be routed through security resources 236 and forwarded to RAN 120 via a wireless cellular connection. Similarly, application traffic 420 from RAN 120 may be forwarded to TEE 204 over the network slice and passed on to the respective application in REE 202.

FIG. 4 illustrates communications for enforcing access control for network slices via proxy in a secure enclave in conjunction with life cycle management provided via a proxy image manager 150. In other implementations, an app store (e.g., application provider network 160) may provide a separate application (e.g., one of client applications 117) for UE device 110 to provide life cycle management for SACP 115.

Figure 5:
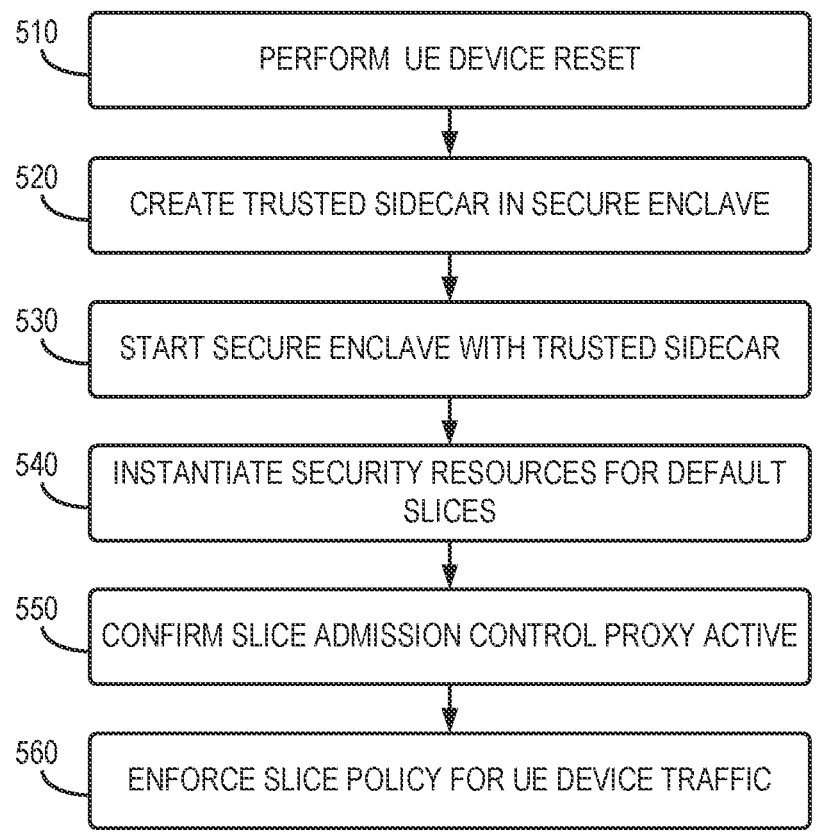
FIGS. 5 and 6 are flow diagrams illustrating example processes for enforcing access control for network slices via proxy in a secure enclave of a UE device, according to implementations described herein.

FIG. 5 is a flow diagram illustrating an example process 500 for enforcing access control for network slices via proxy in a secure enclave of a UE device. In the example of FIG. 5, life cycle management of a trusted proxy is performed in conjunction with a mobile network provider service (e.g., proxy image manager 150) to remotely download a trusted proxy image. In one implementation, process 500 may performed by UE device 110. In another implementation, process 500 may be implemented by UE device 110 in conjunction with one or more other devices in network environment 100.

Process 500 may include performing a UE device reset (block 510) and creating a trusted sidecar in a secure enclave (block 520). For example, a user may initiate a restart of UE device 110, causing UE device 110 to reboot. As part of the reboot process, SE 208 may retrieve the latest available proxy image for SACP 115 from proxy image manager 150 and conduct an image update over any previous pre-loaded instance of SACP 115 in TEE 204. SACP 115 may, thus, include the most recent slice access policies for the mobile network provider.

Process 500 may further include starting the secure enclave with the trusted sidecar (block 530), instantiating security resources for default slices (block 540), and confirming that the slice admission control proxy is active (block 550). For example, components of SACP 115 may be instantiated and activated in TEE 204 to apply slice access controls. For default slices, as part of a boot/re-boot process, orchestrator 230 may instantiate security resources (e.g., security resources 226-1 and 226-2) to provide required security. The security resources 226-1 and 226-2 that have been instantiated will be used to protect 3GPP control plane (e.g., RRC, NAS messages) and user plane respectively. The security resources would support NIA and NEA algorithms as specified by 3GPP and other security functionalities (e.g., random number generator) required to provide data-in-transit and data-at-rest security.

Process 500 may additionally include enforcing slice policies for UE device traffic (block 560). For example, UE device 110 may force (or route) traffic for functions 216 through the instantiated security resources 226 of SACP 115. The security resources (e.g., security resources 226-1 and 226-2) may enforce network slice policies for packets flowing to and from special slices in network environment 100. Security resources 226 for applications that require special treatment in addition to the generic security resources that have been instantiated for control and user plane protection (e.g., such as for client applications 216-3 and 216-4) may be instantiated when the application is launched, as described further in connection with FIG. 7.

Figure 6:
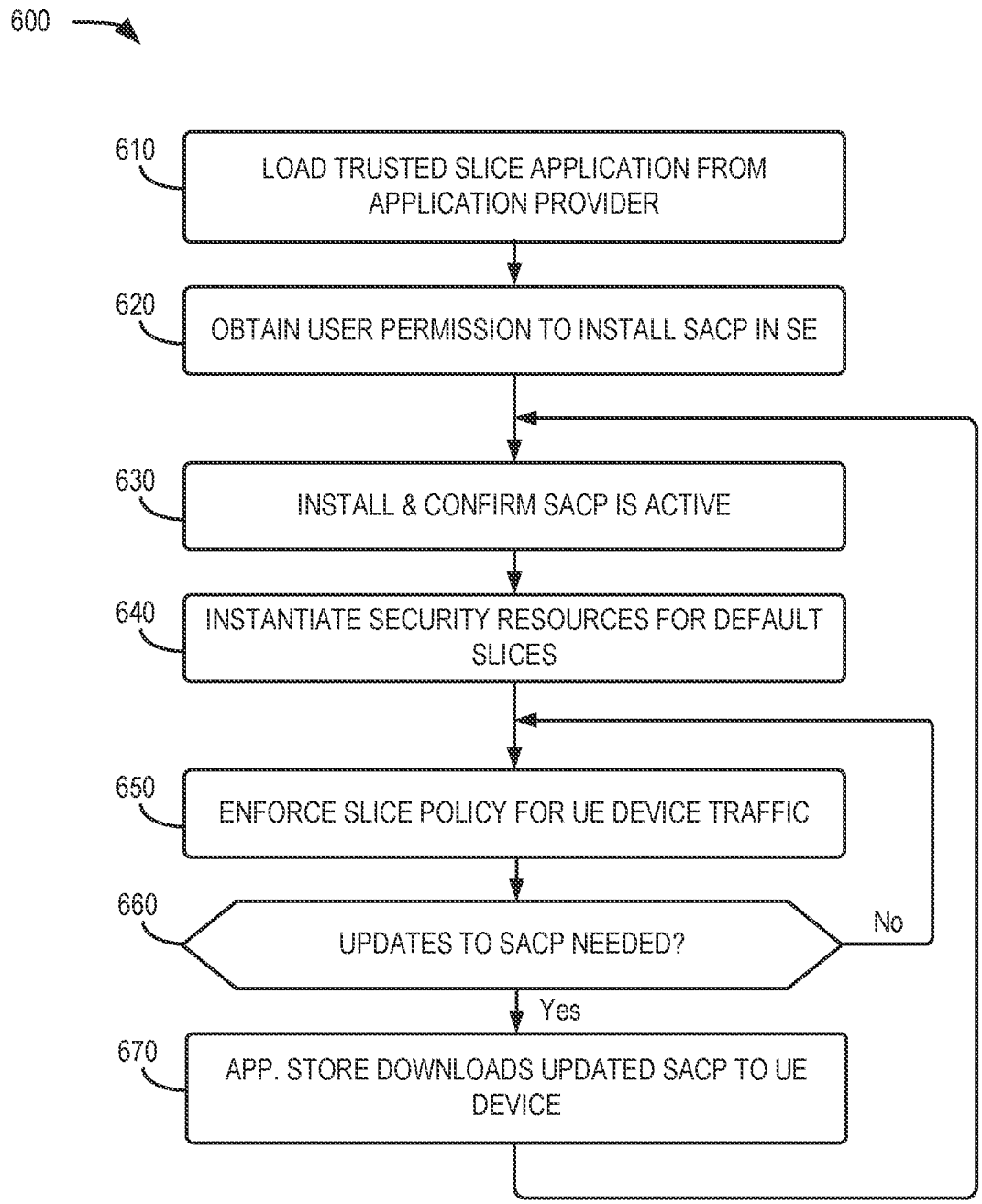

FIG. 6 is a flow diagram illustrating another example process 600 for enforcing access control for network slices via proxy in a secure enclave of a UE device. In the example of FIG. 6, life cycle management of a trusted proxy is performed in conjunction with an app store (e.g., application provider network 160) that may be managed by a third party provider. In one implementation, process 600 may performed by UE device 110. In another implementation, process 600 may be implemented by UE device 110 in conjunction with one or more other devices in network environment 100.

Process 600 may include loading a trusted slice management application from an application provider (block 610) and obtain user permission to install a SACP in a secure enclave of the UE device (block 620). For example, using an app store or other application source (e.g., application provider 150) UE device 110 may download a trusted slice management application for a particular mobile network provider. The trusted slice management application may be programmed to configure a sidecar enclave for UE device 110 and may query the user of UE device 110 for permission to install the sidecar.

Process 600 may also include installing an SACP and confirming the SACP is active (block 630), instantiating security resources for default slices (block 640), and enforcing slice policy for UE device traffic (block 650). For example, components of SACP 115 may be instantiated and activated in TEE 204 to apply slice access controls. For default slices, as part of a boot/re-boot process, orchestrator 230 may instantiate security resources (e.g., security resources 226-1 and 226-2) to provide required security. Using the most recent available policies for the mobile network provider, SACP 115 may force network slice traffic through the instantiate security resources 226 and enforce network slice policies for packets flowing to and from special slices in network environment 100. Security resources for enforcement of network slice polices for client applications (e.g., applications 216-3 and 216-4) that are launched after a UE device boot process may be instantiated as described further in connection with FIG. 7.

Process 600 may further include determining if updates to the SACP are needed (block 660). For example, the mobile network provider may provide SACP 115 updates to application provider 150, and application provider 150 may signal the trusted slice management application on UE device 110 to retrieve an updated proxy image.

If the trusted slice management application of UE device 110 does not receive an update signal from application provider 150 (e.g., process block 660—No), SACP 115 will continue to enforce existing slice access policies for special slices. If the trusted slice management application of UE device 110 receives an update signal from application provider 150 (e.g., process block 660—Yes), UE device 110 may download the updated SACP (block 670) and process 600 may return to process block 630 to install the update.

Figure 7:
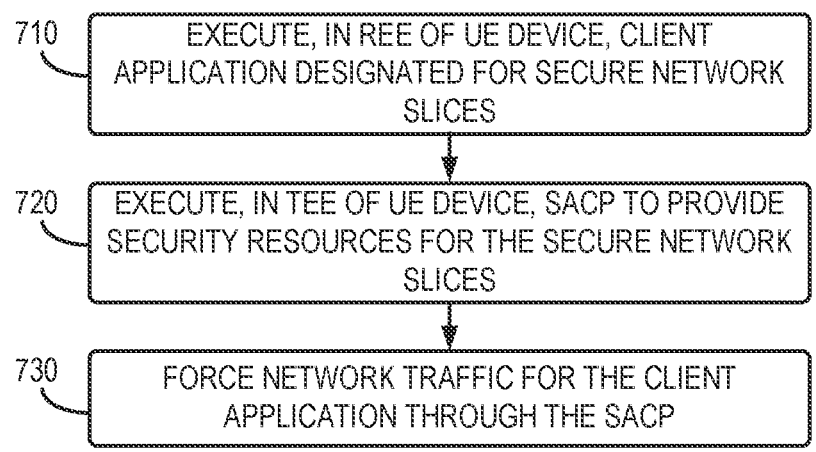
FIG. 7 is a flow diagram illustrating example processes for enforcing slice policies for applications launched after a device boot process.

Process blocks 560 and/or 650 may include blocks described in FIG. 7 to enforce slice policies for applications launched after a device boot process. As shown in FIG. 7, process blocks 550/640 may include executing, in a REE of a UE device, a client application designated for using one or more secure network slices (block 710); executing, in a TEE of the UE device, a SACP to provide security resources for the secure network slices (block 720); and forcing, by the UE device, network traffic for the client application through the SACP (block 730). For example, as described above in connection with FIG. 2, eMBB client application 216-3 and/or eMBB client application 216-4 may be launched in REE 202. Based on the security profiles (e.g., security profiles 214) for applications 216-3 and 216-4, orchestrator 230 may create one or more security resources 226 in TEE 204 to support admission control for applications 216-3 and 216-4. For example, a dedicated security resource 226-3 for TLS may be instantiated for eMBB application 216-3, and a separate dedicated security resource 226-4 may be instantiated for eMBB application 216-4, while both applications 216-3/216-4 may use a shared security resource 226-2 for 3GPP user plane security and security resource 226-1 for 3GPP control plane security. Security resources 226 may provide policy enforcement at the UE device level to enable providers to provide end-to-end security for traffic from applications 216-3/216-4 that enters and exits the modem (e.g., communication interface 325) of UE device 110. In some scenarios, the security resources 226-1, 226-2 for protecting 3GPP control plane and user plane may be instantiated and deployed within the TEE 204, REE 202, or within the UE device's modem based the security profile associated with the default slice as determined by the NSSAI. Similarly, the security resources 226-3, 226-4 for protecting the applications 216-3, 216-4 may be instantiated and deployed within the TEE 204, REE 202, or the within the UE device's modem based on the security profile associated with the application. An application's traffic may be protected using the security resource 226-3 or 226-4 at the application layer and using user-plane security resource 226-2 at the 3GPP layer. In some cases, based on the security profile associated with the application, the application layer security protection may be performed at TEE 204 using the security resource 236-3 or 236-4, and based on the overall security profile associated with the slice, the 3GPP layer user plane security using the security resource 236-2 may be performed at the UE's modem. Any message or data that is used or generated by an application is initially protected using the application layer security resource 226-3 or 226-4, and then the slice security protection is applied using the security resource 226-2 before sending the message or storing the data. While in some other cases, all the protection may occur within TEE 204, and in still some other cases the application security may be performed within REE 202 while the slice security may be applied in TEE 204 or within the modem.

Systems and methods described herein enforce access controls for network slices via proxy in a secure enclave of a UE device. A UE device executes, in a REE, a client application designated for using one or more secure network slices of a telecommunications network. The UE device executes, in a TEE, a slice admission control proxy (SACP) to perform admission control for the one or more secure network slices, and forces network traffic for the client application through the SACP. Life cycle management of the SACP can be managed by providing a trusted proxy image to the UE device at every reboot or as managed by a third-party app store.

The foregoing description of implementations provides illustration and description, but is not intended to be exhaustive or to limit the invention to the precise form disclosed. Modifications and variations are possible in light of the above teachings or may be acquired from practice of the invention. For example, while a series of messages and/or blocks have been described with regard to FIGS. 4-6, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   executing, in a rich execution environment (REE) of a user equipment (UE) device, a function or application designated for using one or more secure network slices of a telecommunications network;
   executing, in a trusted execution environment (TEE) of the UE device, a slice admission control proxy (SACP) to perform admission control for the one or more secure network slices; and
   forcing, by the UE device, network traffic for the function or application through the SACP.

2. The method of claim 1, further comprising:
   retrieving, from a trusted source in the telecommunications network, an updated executable for the SACP as part of each boot process for the UE device.

3. The method of claim 2, further comprising:
   conducting an image update over any previous pre-loaded instance of the SACP using the updated executable for the SACP; and
   activating the SACP.

4. The method of claim 1, further comprising:
   preventing traffic from the UE device on the secure network slices until the SACP is operational in the TEE.

5. The method of claim 1, wherein SACP applies admission control policies provided by a mobile network provider.

6. The method of claim 1, wherein the REE includes a slice-specific security profile for the function or application, and
   wherein the SACP includes a resource orchestrator for assigning security resources in the TEE to implement security requirements for the one or more secure network slices.

7. The method of claim 6, wherein the SACP further includes a mapping table, and
   wherein the resource orchestrator further applies the mapping table to the slice-specific security profile to identify the security resources.

8. The method of claim 1, further comprising:
   retrieving, by the UE device and from a third-party application provider, a trusted slice management application for the telecommunications network; and
   executing, by the UE device in the REE, the trusted slice management application to obtain an updated executable of the SACP for the TEE.

9. The method of claim 1, wherein the SACP includes packet processing software that performs admission controls based on stored policies applied to authenticated traffic flows.

10. A user equipment (UE) device comprising:
    one or more processors configured to:
    execute, in a rich execution environment (REE), a function or application designated for using one or more secure network slices of a telecommunications network,
    execute, in a trusted execution environment (TEE), a slice admission control proxy (SACP) to perform admission control for the one or more secure network slices, and
    force network traffic for the function or application through the SACP.

11. The UE device of claim 10, wherein the one or more processors are further configured to:
    retrieve, from a trusted source, an updated executable for the SACP as part of each boot process for the UE device.

12. The UE device of claim 11, wherein the one or more processors are further configured to:
    conduct an image update over any previous pre-loaded instance of the SACP using the updated executable for the SACP prior to activating the SACP.

13. The UE device of claim 10, wherein the one or more processors are further configured to:
    prevent traffic flow from the UE device on the secure network slices until the SACP is operational.

14. The UE device of claim 10, wherein SACP applies admission control policies provided by a mobile network provider.

15. The UE device of claim 10, wherein the REE includes a slice-specific security profile for the function or application, and
    wherein the SACP includes a resource orchestrator configured to assign security resources in the TEE to implement security requirements for the one or more secure network slices.

16. The UE device of claim 15, wherein the SACP further includes a mapping table, and
    wherein the resource orchestrator is further configured to apply the mapping table to the slice-specific security profile to identify the security resources.

17. The UE device of claim 10, wherein the one or more processors are further configured to:
    retrieve, from a third-party application provider, a trusted slice management application for the telecommunications network; and
    execute, in the REE, the trusted slice management application to obtain an updated executable of the SACP for the TEE.

18. A non-transitory computer-readable medium containing instructions executable by at least one processor of a network device, the instructions configured for:
    executing, in a rich execution environment (REE) of a user equipment (UE) device, a function or application designated for using one or more secure network slices of a telecommunications network;
    executing, in a trusted execution environment (TEE) of the UE device, a slice admission control proxy (SACP) to perform admission control for the one or more secure network slices; and
    forcing, by the UE device, network traffic for the function or application through the SACP.

19. The non-transitory computer-readable medium of claim 18, wherein the instructions are further configured for:
retrieving, from a trusted source in the telecommunications network, an updated executable for the SACP as part of each boot process for the UE device, and
conducting an image update over any previous pre-loaded instance of the SACP using the updated executable for the SACP.

20. The non-transitory computer-readable medium of claim 18, wherein the instructions are further configured for:
preventing traffic from the UE device on the secure network slices until the SACP is operational in the TEE.

* * * * *